United States Patent
Lee et al.

(10) Patent No.: US 9,874,162 B2
(45) Date of Patent: Jan. 23, 2018

(54) SYSTEM FOR CONTROLLING ENGINE USING VARIABLE VALVE LIFT AND METHOD THEREOF

(71) Applicant: HYUNDAI MOTOR COMPANY, Seoul (KR)

(72) Inventors: JangSu Lee, Yongin-si (KR); Hyo Sang Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 14/804,120

(22) Filed: Jul. 20, 2015

(65) Prior Publication Data

US 2016/0169130 A1    Jun. 16, 2016

(30) Foreign Application Priority Data

Dec. 15, 2014    (KR) .................. 10-2014-0180668

(51) Int. Cl.
| | |
|---|---|
| *F02D 41/00* | (2006.01) |
| *F02D 41/10* | (2006.01) |
| *F02D 41/14* | (2006.01) |
| *F02M 26/05* | (2016.01) |

(Continued)

(52) U.S. Cl.
CPC ...... *F02D 41/0007* (2013.01); *F01L 13/0015* (2013.01); *F02D 41/0052* (2013.01); *F02D 41/107* (2013.01); *F02D 41/0005* (2013.01); *F02D 41/1448* (2013.01); *F02D 41/1454* (2013.01); *F02D 2041/001* (2013.01); *F02D 2041/002* (2013.01); *F02D 2041/0017* (2013.01); *F02D 2200/0406* (2013.01); *F02M 26/05* (2016.02); *F02M 26/06* (2016.02); *Y02T 10/144* (2013.01); *Y02T 10/47* (2013.01)

(58) Field of Classification Search
CPC .............. F01L 13/0015; F02D 41/0005; F02D 41/0007; F02D 41/0052; F02D 41/107; F02D 41/1448; F02D 41/1454; F02D 2041/001; F02D 2041/0017; F02D 2041/002; F02D 2200/0406; F02M 26/05; F02M 26/06; Y02T 10/144; Y02T 10/47
See application file for complete search history.

(56) References Cited

U.S. PATENT DOCUMENTS

2010/0313862 A1*  12/2010  Lee .................. F01N 13/009
123/676

FOREIGN PATENT DOCUMENTS

| EP | 2522839 A2 * | 11/2012 | ........... F01D 17/165 |
|---|---|---|---|
| JP | 2001-140652 A | 5/2001 | |
| JP | 2004-092479 A | 3/2004 | |

(Continued)

*Primary Examiner* — Audrey K Bradley
(74) *Attorney, Agent, or Firm* — McDermott Will & Emery LLP

(57) ABSTRACT

A system for controlling an engine includes a driving information detector detecting driving information. At least one intake valve and at least one exhaust valve open and close the combustion chamber. A variable valve lift (VVL) system adjusts opening timing of the intake valve and the exhaust valve. A compressor rotates by a rotational force of a turbine and compresses intake air, and a vane adjusts the amount of exhaust gas supplied to the turbine. A controller controls opening of the vane using a high pressure EGR valve, when the exhaust valve is open during a suction stroke by the VVL system, the vehicle accelerates or decelerates, and an air/fuel ratio is beyond reference ratio range.

7 Claims, 4 Drawing Sheets

(51) Int. Cl.
  *F02M 26/06* (2016.01)
  *F01L 13/00* (2006.01)

(56) References Cited

FOREIGN PATENT DOCUMENTS

| | | |
|---|---|---|
| JP | 5113126 B2 | 1/2013 |
| JP | 2013-151864 A | 8/2013 |
| JP | 2014-109231 A | 6/2014 |
| KR | 10-2004-0057443 A | 7/2004 |
| KR | 10-2009-0063914 A | 6/2009 |

* cited by examiner

SYSTEM FOR CONTROLLING ENGINE USING VARIABLE VALVE LIFT AND METHOD THEREOF

CROSS-REFERENCE TO RELATED APPLICATION

This application claims the benefit of priority to Korean Patent Application No. 102014-0180668 filed in the Korean Intellectual Property Office on Dec. 15, 2014, the entire content of which is incorporated herein by reference.

TECHNICAL FIELD

The present disclosure relates to a system for controlling an engine and a method thereof. More particularly, the present disclosure relates to a system for controlling an engine that can improve an engine output and reduce fuel consumption by controlling boost pressure and air amount flowing into a combustion chamber using a target exhaust gas recirculation (EGR) rate during an acceleration/deceleration period.

BACKGROUND

Generally, an engine includes a combustion chamber providing driving torque by combustion of fuel, an intake valve disposed in the combustion chamber and supplying a mixed gas including a fuel, and an exhaust valve discharging burned gas.

The intake valve and the exhaust valve open and close the combustion chamber by a valve opening device connected to a crankshaft.

Recently, research has been undertaken on a variable valve lift (VVL) system that enables different valve lifts depending on a rotational speed of the engine in order to achieve optimal valve operation depending on engine speed.

In the engine having the VVL system, exhaust gas discharged from the combustion chamber may be flowed into the combustion chamber by opening the exhaust valve during a suction stroke.

According to the conventional art, when a vehicle accelerates, since the engine speed and a load increases, boost pressure increases by decreasing opening of a vane provided in a turbocharger. However, as opening of the vane decreases, a front end pressure of a turbine provided in the turbocharger and exhaust gas recirculation (EGR) increases.

Accordingly, an air amount flowing into the combustion chamber cannot follow a target air amount, an air/fuel ratio is deteriorated, and a fuel amount injected into the combustion chamber is limited. Therefore, since the fuel amount injected into the combustion chamber increases in order to output a target torque, fuel consumption is deteriorated.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a system for controlling an engine that can accurately control a target boost pressure and a target amount of air when a vehicle accelerates or decelerates and exhaust gas flows into a combustion chamber by using a variable valve lift (VVL) system.

A system for controlling an engine according to an exemplary embodiment of the present inventive concept may include a driving information detector configured to detect driving information including a vehicle speed, an engine speed, a fuel injection amount, an atmospheric pressure, an intake air temperature, and a displacement of an accelerator pedal. At least one intake valve and at least one exhaust valve open and close the combustion chamber. A variable valve lift (VVL) system adjusts opening timing of the intake valve and the exhaust valve. A turbocharger includes a turbine which rotates by exhaust gas exhausted from the combustion chamber, a compressor which rotates by a rotational force of the turbine and compresses intake air, and a vane which adjusts the amount of exhaust gas supplied to the turbine. A controller is configured to control opening of the vane: according to a target EGR rate and the amount of air flowing into the combustion chamber using a high pressure EGR valve; when the exhaust valve is opened during a suction stroke by the VVL system; the vehicle accelerates or decelerates; and the air/fuel ratio is beyond a reference ratio range. The engine includes a combustion chamber providing a driving torque by combustion of a fuel.

The target EGR rate may be determined according to a pressure difference between an intake manifold and an exhaust manifold of the engine and a pressure of the intake manifold.

The target EGR rate may decrease as the pressure difference decreases, and the target EGR rate increases as the differential pressure increases. The target EGR rate decreases as the pressure of the intake manifold increases, and the target EGR rate increases as the pressure of the intake manifold decreases when the differential pressure is maintained to be the same.

The controller may determine whether the vehicle accelerates or decelerates based on a vehicle speed variation, an engine speed variation, or the displacement of the accelerator pedal.

The controller may control the opening of the vane according to the target EGR rate and the amount of air flowing into the combustion chamber using the high pressure EGR valve only when the air/fuel ratio is beyond the reference ratio range.

The controller may set a target boost pressure and a target amount of air flowing into the combustion chamber from the detected driving information, and feedback-control the boost pressure and the amount of air: according to the target boost pressure and the target amount of air; when the exhaust valve of the combustion chamber is closed during the suction stroke, the vehicle does not accelerate or decelerate, or the air/fuel ratio is within the reference ratio range.

The controller may control the opening of the vane of the turbocharger by comparing the target boost pressure to an actual boost pressure and the high pressure EGR valve by comparing the target air amount to an actual air amount.

A method for controlling an engine according to another exemplary embodiment of the present inventive concept may include detecting driving information including a vehicle speed, an engine speed, a fuel injection amount, an atmospheric pressure, an intake air temperature, and a displacement of an accelerator pedal by a driving information detector. Whether an exhaust valve is open during a suction stroke of a combustion chamber is determined by a controller; determining whether a vehicle is accelerated or decelerated; determining whether an air/fuel ratio is within a reference range. Opening of a vane provided in a turbine of a turbocharger is controlled: according to a target EGR rate and an amount of air flowing into the combustion chamber using a high pressure EGR valve; when the exhaust valve of the combustion chamber is closed during a suction stroke; the vehicle does not accelerate or decelerate; or the air/fuel ratio is within a reference ratio range.

The target EGR rate may be determined from a pressure difference between an intake manifold and an exhaust manifold of the engine and a pressure of the intake manifold.

The target EGR rate may decrease as the pressure difference decreases, the target EGR rate increases as the differential pressure increases. The target EGR rate may decrease as the pressure of the intake manifold increases, and the target EGR rate may increase as the pressure of the intake manifold decreases when the pressure difference is maintained to be the same.

The method may further include, when the exhaust valve is closed during the suction stroke, the vehicle does not accelerate or decelerate, or the air/fuel ratio is within the reference ratio range, setting a target boost pressure and a target amount of air flowing into the combustion chamber from the driving information including the engine speed, the fuel injection amount, the atmospheric pressure, the intake air temperature, and the displacement of the accelerator pedal, and feedback-controlling a boost pressure and the amount of air according to the target boost pressure and the target amount of air.

The opening of the vane may be controlled by comparing the target boost pressure to an actual boost pressure, and the high pressure EGR valve may be controlled by comparing the target amount of air to an actual air amount.

According to the present disclosure, it is possible to accurately control a boost pressure and an air amount flowing into an engine by controlling opening of a vane according to a target EGR rate and a high pressure EGR valve according to a target air amount.

Further, since an exhaust valve is opened during a suction stroke by a VVL system, exhaust gas is reflowed into a combustion chamber and it is possible to increase temperature of an exhaust gas during an exhaust stroke.

Accordingly, since temperature of a catalyst is increased, a reduction rate of the exhaust gas by the catalyst is improved.

BRIEF DESCRIPTION OF THE DRAWINGS

The accompanying drawings, together with the specification, illustrate exemplary embodiments of the present invention, and, together with the description, serve to explain the principles of the present disclosure.

DETAILED DESCRIPTION OF THE EMBODIMENTS

Figure 1:
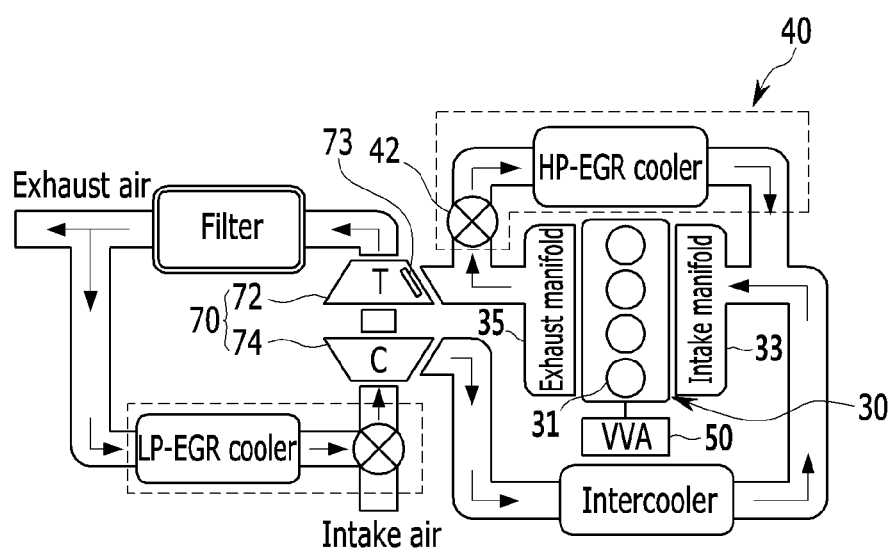
FIG. 1 is a schematic view illustrating a system for controlling an engine according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

In order to clearly describe the present invention, portions that are not connected with the description will be omitted. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, a system for controlling an engine according to an exemplary embodiment of the present inventive concept will be described in detail with reference to accompanying drawings.

Figure 2:
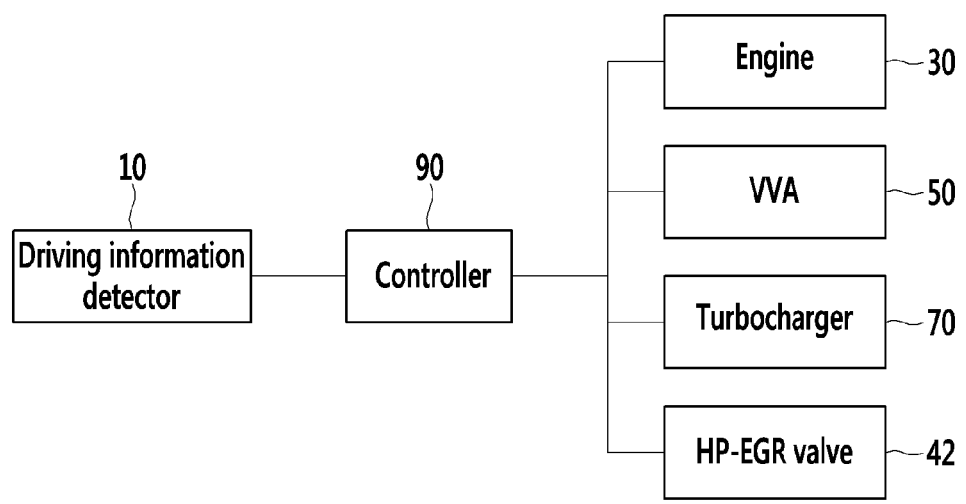
FIG. 2 is a block diagram illustrating a system for controlling an engine according to an exemplary embodiment of the present inventive concept.

FIG. 1 is a schematic view illustrating a system for controlling an engine according to an exemplary embodiment of the present inventive concept. FIG. 2 is a block diagram illustrating a system for controlling an engine according to an exemplary embodiment of the present inventive concept.

As shown in FIGS. 1 and 2, a system for controlling an engine according to an exemplary embodiment of the present inventive concept includes a driving information detector 10 detecting various driving information. An engine 30 supplies a driving torque, a turbocharger 70 supplying boost air to the engine 30. A high pressure exhaust gas recirculation (EGR) system 40 recirculates exhaust gas to the engine 30 by extracting the exhaust gas at an upstream side of the turbocharger 70. A controller 90 is configured to control the engine 30, the turbocharger 70, and the high pressure EGR system 40.

The driving information detector 10 detects a vehicle speed, an engine speed, a fuel injection amount, an atmospheric pressure, an intake air temperature, and a displacement of an accelerator pedal, and supplies the detected driving information to the controller 90. The driving information detector 10 may include a vehicle speed sensor detecting the vehicle speed, an engine speed sensor detecting the engine speed, an atmospheric pressure sensor detecting atmospheric pressure, an intake temperature sensor detecting the intake air temperature, and an accelerator pedal sensor detecting displacement of the accelerator pedal.

The engine 30 includes a combustion chamber 31 supplying the driving torque by combustion of a fuel. At least one intake valve is disposed in the combustion chamber 31 for selectively supplying the fuel to the combustion chamber 31, and at least one exhaust valve is disposed in the combustion chamber 31 for selectively expelling an exhaust gas.

The turbocharger 70 compresses intake air through the exhaust gas exhausted from the combustion chamber 31 and supplies the compressed air to the engine 30.

The turbocharger 70 includes a turbine 72 rotating by the exhaust gas exhausted from the combustion chamber 31. A compressor 74 rotates by rotational force of the turbine 72 and compresses intake air, and a vane 73 adjusts the amount of an exhaust gas supplied to the turbine 72.

When opening of the vane 73 decreases, a velocity of the exhaust gas flowing into the turbine 72 and a boost pressure supplied to the combustion chamber 31 increase. When opening of the vane 73 increases, the velocity of the exhaust gas flowing into the turbine 72 and the boost pressure supplied to the combustion chamber 31 decrease.

The high pressure EGR system 40 extracts the exhaust gas having a high temperature at an upstream side of the turbocharger 70 and recirculates the exhaust gas to the engine 30. The high pressure EGR system 40 includes a high pressure EGR valve 42 adjusting flow rate of the high pressure EGR, and a high pressure EGR cooler cooling the high temperature exhaust gas. The exhaust gas, which passes through the high pressure EGR cooler, flows into the engine 30 through an intake manifold 33.

The system for controlling the engine according to an exemplary embodiment of the present inventive concept further includes a variable valve lift (VVL) system 50 that adjusts opening timing and closing timing of the intake valve and the exhaust valve.

Opening/closing of the intake valve and the exhaust valve is operated by rotating a camshaft, and the VVL system 50 advances or retards the opening timing and the closing timing by the controller 90.

The VVL system 50 is well known to a skilled person, and hence no detailed description will be provided.

Figure 3:
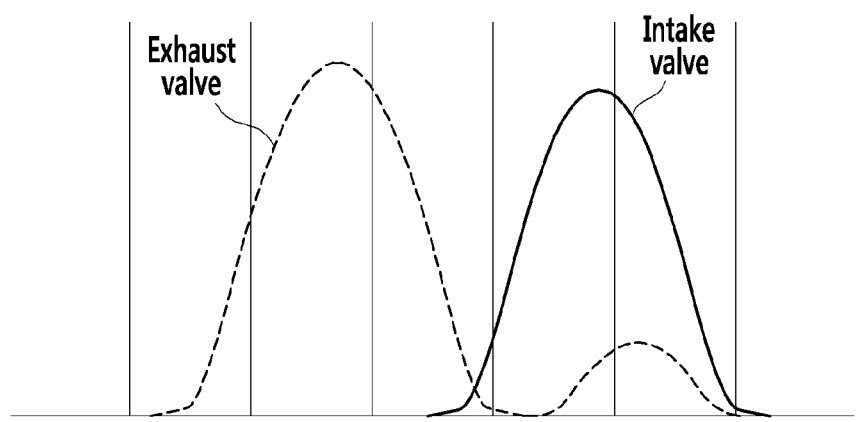
FIG. 3 is a graph illustrating phase of an intake valve and an exhaust valve according to an exemplary embodiment of the present inventive concept.

As shown in FIG. 3, the VVL system 50 opens the exhaust valve during an intake stroke of the combustion chamber 31 when a driving condition, for example, a catalyst temperature of an exhaust gas purification apparatus increases according to a predetermined driving condition.

When the exhaust valve is open during the intake stroke, the exhaust gas exhausted is supplied to the combustion chamber 31. The exhaust gas resupplied to the combustion chamber 31 is exhausted to the exhaust gas purification apparatus at a next exhaust stroke through a compression stroke. At this state, a temperature of re-exhausted exhaust gas increases, a catalyst temperature provided in the exhaust gas purification apparatus increases by the increased exhaust gas, and thereby a purification rate of the exhaust gas increases.

The controller 90 may be implemented by one or more processors operated by a predetermined program, in which the predetermined program is set to perform steps of the method for controlling the engine according to an exemplary embodiment of the present inventive concept.

The controller 90 controls the opening of the vane 73 according to a target EGR rate and the amount of air flowing into the combustion chamber 31 using the high pressure EGR valve 42. When the exhaust valve is open during suction stroke by the variable valve apparatus 50, a vehicle accelerates or decelerates and the air/fuel ratio is beyond a reference ratio range.

In detail, the controller 90 reduces the opening of the vane 73 when the target EGR rate is less than an actual EGR rate. On the contrary, the controller 90 increases the opening of the vane 73 when the target EGR rate is greater than the actual EGR rate.

The target EGR rate is a recirculation rate of the exhaust gas, and may be modeled according to a differential pressure and a pressure of the intake manifold. The differential pressure is a pressure between the pressure of the intake manifold and the pressure of the exhaust manifold. The target EGR rate may be stored in the controller 90 as a map data according to the differential pressure and the pressure of the intake manifold 33.

As the differential pressure increases, the target EGR rate increases, and as the differential pressure decreases, the target EGR rate decreases. When the differential pressure is maintained to be the same, as the pressure of the intake manifold 33 increases, the target EGR rate decreases, and as the pressure of the intake manifold 33 decreases, the target EGR rate increases.

The controller 90 may determine whether the vehicle accelerates or decelerates from a vehicle speed variation, an engine speed variation, or a displacement of the accelerator pedal. For example, when the vehicle speed variation is greater than a reference vehicle speed value, the engine speed variation is greater than a reference engine speed value, or the displacement of the accelerator pedal is greater than a reference displacement value, the controller 90 determines that the vehicle accelerates.

The controller 90 controls the opening of the vane 73 according to the target EGR rate and the amount of air flowing into the combustion chamber 31 using the high pressure EGR valve 42 only when the air/fuel ratio is within the reference ratio range.

The controller 90 sets a target boost pressure and a target amount of air flowing into the combustion chamber 31 from the detected driving information and feedback-controls the boost pressure and the amount of air according to the target boost pressure and the target amount of air, when the exhaust valve is closed during the suction stroke by the variable valve apparatus 50, the vehicle does not accelerate or decelerate, or the air/fuel ratio is within the reference ratio range.

The controller 90 controls the opening of the vane 73 according to the target boost pressure, and controls the high pressure EGR valve 42 according to the target amount of air.

In detail, the controller 90 increases the opening of the vane 73 when the boost pressure is less than the target boost pressure, and decreases opening of the vane 73 when the boost pressure is greater than the target boost pressure.

The controller 90 opens the high pressure EGR valve 42 when the amount of air is less than the target amount of air, and closes the high pressure EGR valve 42 when the amount of air is greater than the target amount of air.

Hereinafter, a method for controlling an engine according to an exemplary embodiment of the present inventive concept will be described in detail.

Figure 4:
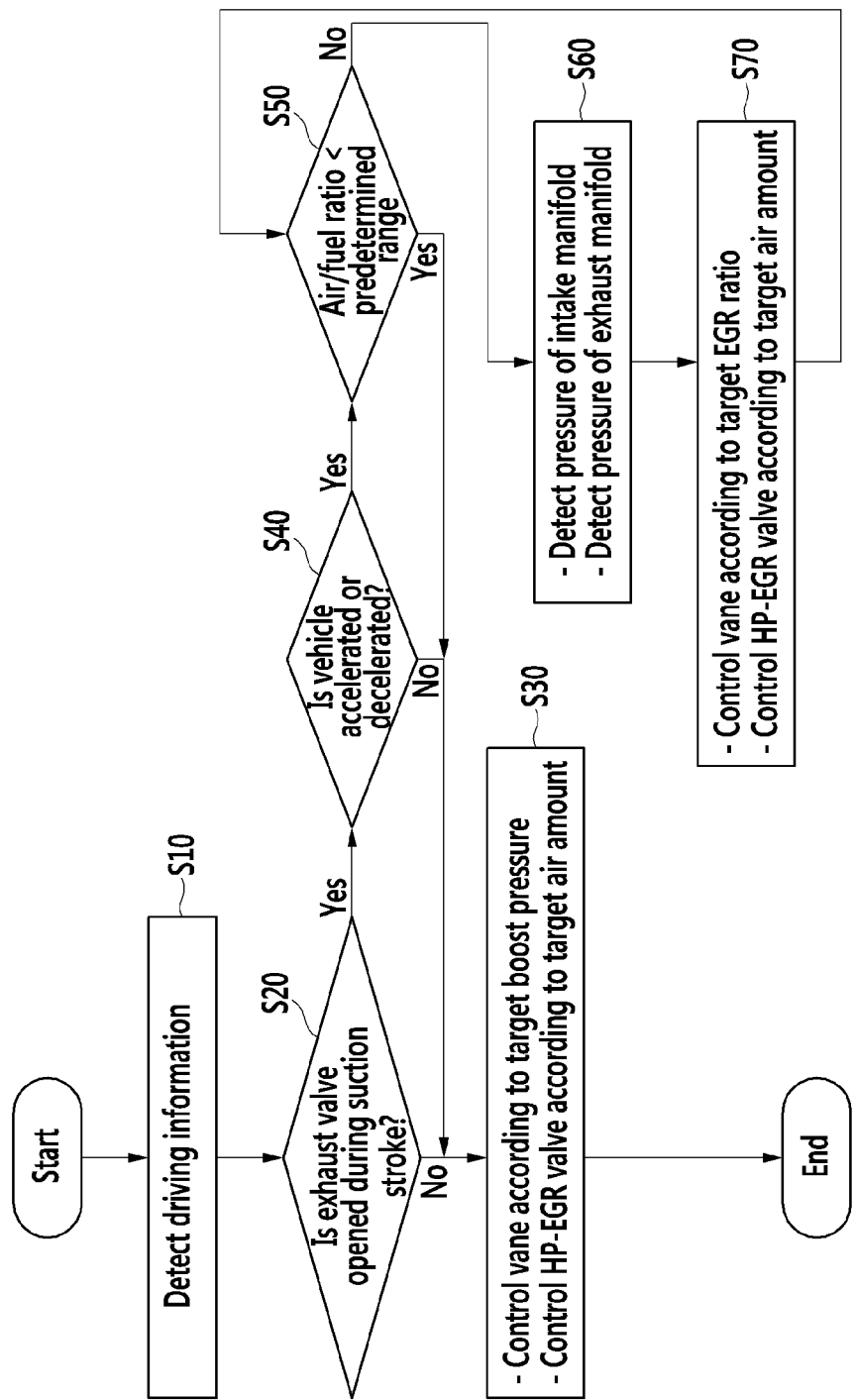
FIG. 4 is a flowchart illustrating a method for controlling an engine according to an exemplary embodiment of the present inventive concept.

FIG. 4 is a flowchart illustrating a method for controlling an engine according to an exemplary embodiment of the present inventive concept.

As shown in FIG. 4, the driving information detector 10 detects driving information including a vehicle speed, an engine speed, a fuel injection amount, an atmospheric pressure, an intake air temperature, and a displacement of an accelerator pedal at step S10. The detected driving information is supplied to the controller 90.

The controller 90 determines whether the exhaust valve is open during the suction stroke by using the variable valve apparatus 50 at step S20.

When the exhaust valve is closed during suction stroke, the controller 90 sets a target boost pressure and a target amount of air flowing into the combustion chamber 31 based on the detected driving information and feedback-controls the boost pressure and the amount of air according to the target boost pressure and the target air amount at step S30.

In detail, the controller 90 increases opening of the vane 73 when the boost pressure is less than the target boost pressure, and decreases opening of the vane 73 when the boost pressure is greater than the target boost pressure at step S30.

The controller 90 opens the high pressure EGR valve 42 when the amount of air is less than the target amount of air, and closes the high pressure EGR valve 42 when the amount of air is greater than the target amount of air at step S30.

The controller determines whether the vehicle accelerates or decelerates when the exhaust valve is open during the suction stroke at step S40.

When the vehicle does not accelerate or decelerate, the controller 90 moves to the step S30.

When the vehicle accelerates or decelerates, the controller determines whether the air/fuel ratio is within a reference raiot range at step S50.

When the air/fuel ratio is within the reference ratio range, the controller moves to the step S30.

When the air/fuel ratio is beyond the reference ratio range, the driving information detector detects a pressure of the intake manifold 33 and a pressure of the exhaust manifold 35 at step S60. The measured pressure of the intake manifold 33 and the exhaust manifold 35 is supplied to the controller 90.

The controller 90 sets a target EGR rate from a differential pressure and a pressure of the intake manifold 33. The differential pressure is a pressure difference between the intake manifold 33 and the exhaust manifold 35. The controller 90 decreases opening of the vane 73 when the target EGR rate is less than an actual EGR rate, and increases the opening of the vane 73 when the target EGR rate is greater than the actual EGR rate at step S70.

The controller controls the high pressure EGR valve 42 according to the target amount of air determined from the driving information detected by the driving information detector 10 at step S70. In detail, the controller 90 increases the opening of the vane 73 when the boost pressure is less than the target boost pressure, and decreases the opening of the vane 73 when the boost pressure is greater than the target boost pressure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling an engine comprising:
    a plurality of sensors configured to detect driving information including a vehicle speed, an engine speed, a fuel injection amount, an atmospheric pressure, an intake air temperature, and a displacement of an accelerator pedal;
    at least one intake valve and at least one exhaust valve opening and closing a combustion chamber;
    a variable valve lift (VVL) system, implemented by a first processor, configured to adjust opening timing of the at least one intake valve and the at least one exhaust valve;
    a turbocharger including: a turbine which rotates by exhaust gas exhausted from the combustion chamber; a compressor which rotates by a rotational force of the turbine and compresses intake air; and a vane which adjusts an amount of exhaust gas supplied to the turbine; and
    a controller, implemented by a second processor, configured to determine whether the exhaust valve is opened during a suction stroke by the VVL system, whether a vehicle is accelerated or decelerated, and whether an air/fuel ratio is within a reference ratio range, and control opening of the vane according to a target exhaust gas recirculation (EGR) rate and an amount of air flowing into the combustion chamber using a high pressure EGR valve when it is determined that the exhaust valve is open during the suction stroke by the VVL system, the vehicle accelerates or decelerates and the air/fuel ratio is not within the reference ratio range,
    wherein the combustion chamber provides a driving torque by combustion of a fuel.

2. The system of claim 1,
    wherein the target EGR rate is determined according to a pressure difference between an intake manifold and an exhaust manifold of the engine and a pressure of the intake manifold.

3. The system of claim 2,
    wherein the target EGR rate decreases as the pressure difference decreases, and the target EGR rate increases as the pressure difference increases, and
    the target EGR rate decreases as the pressure of the intake manifold increases, and the target EGR rate increases as the pressure of the intake manifold decreases when the differential pressure is maintained to be the same.

4. The system of claim 1,
    wherein the controller determines whether the vehicle accelerates or decelerates based on a vehicle speed variation, an engine speed variation, or the displacement of the accelerator pedal.

5. The system of claim 1,
    wherein the controller controls the opening of the vane according to the target EGR rate and the amount of air flowing into the combustion chamber using the high pressure EGR valve only when it is determined that the air/fuel ratio is not within the reference ratio range.

6. The system of claim 1,
    wherein the controller sets a target boost pressure and a target amount of air flowing into the combustion chamber from the detected driving information and feedback-controls a boost pressure and the amount of air according to the target boost pressure and the target amount of air when it is determined that the exhaust valve of the combustion chamber is not opened during the suction stroke, the vehicle does not accelerate or decelerate, or the air/fuel ratio is within the reference ratio range.

7. The system of claim 6,
    wherein the controller controls the opening of the vane of the turbocharger by comparing the target boost pressure to an actual boost pressure and the high pressure EGR valve by comparing the target amount of air to an actual amount of air.

* * * * *